United States Patent

Bellware

[15] 3,699,605
[45] Oct. 24, 1972

[54] DEPRESSED PARK WINDSHIELD WIPER

[72] Inventor: James D. Bellware, Dayton, Ohio

[73] Assignee: General Motors Corporation, Detroit, Mich.

[22] Filed: June 18, 1971

[21] Appl. No.: 154,344

[52] U.S. Cl..............................15/250.17, 74/600
[51] Int. Cl...............................................B60s 1/02
[58] Field of Search.........18/250.17, 250.16, 250.19; 74/75, 600

[56] References Cited

UNITED STATES PATENTS

| | | | |
|---|---|---|---|
| 3,115,598 | 12/1963 | Ziegler.....................74/600 X |
| 3,091,128 | 5/1963 | De Rees et al...........74/600 X |
| 3,242,520 | 3/1966 | Carroll et al.............74/600 X |
| 3,353,425 | 11/1967 | Abel, Jr..............15/250.17 X |
| 3,588,940 | 6/1971 | Mainka et al...........15/250.17 |

*Primary Examiner*—Peter Feldman
*Attorney*—W. E. Finken et al.

[57] ABSTRACT

In a preferred form, this disclosure relates to an actuating mechanism for use in oscillating a pair of windshield wipers between inboard and outboard positions during running operation and for moving the wipers to a depressed park position spaced from the inboard position when wiper operation is being terminated. The actuating mechanism includes the housing means, a drive shaft rotatably supported by the housing means, a drive member, a drive gear drivingly connected to the drive shaft, an eccentric supported for rotation relative to the drive shaft, a crank arm rotatably journaled on the eccentric, means for drivingly connecting the crank arm to the drive shaft and for permitting the crank arm to move radially with respect to the drive shaft, and an shiftable sleeve drivingly connected with the eccentric and being shiftable between a first position in which it is drivingly engaged with the drive gear to cause the eccentric to be rotated in unison with the drive shaft and the crank arm to be rotated about an orbit of a given radius during running operation of the wipers and a second position in which it is disengaged from the drive gear to cause the crank arm to be rotated relative to the eccentric and moved radially of the drive shaft to increase the radius or throw of the crank arm to effect movement of the wipers to their park position.

3 Claims, 7 Drawing Figures

PATENTED OCT 24 1972

INVENTOR.
James D. Bellware
BY
W.A. Schuetz
ATTORNEY

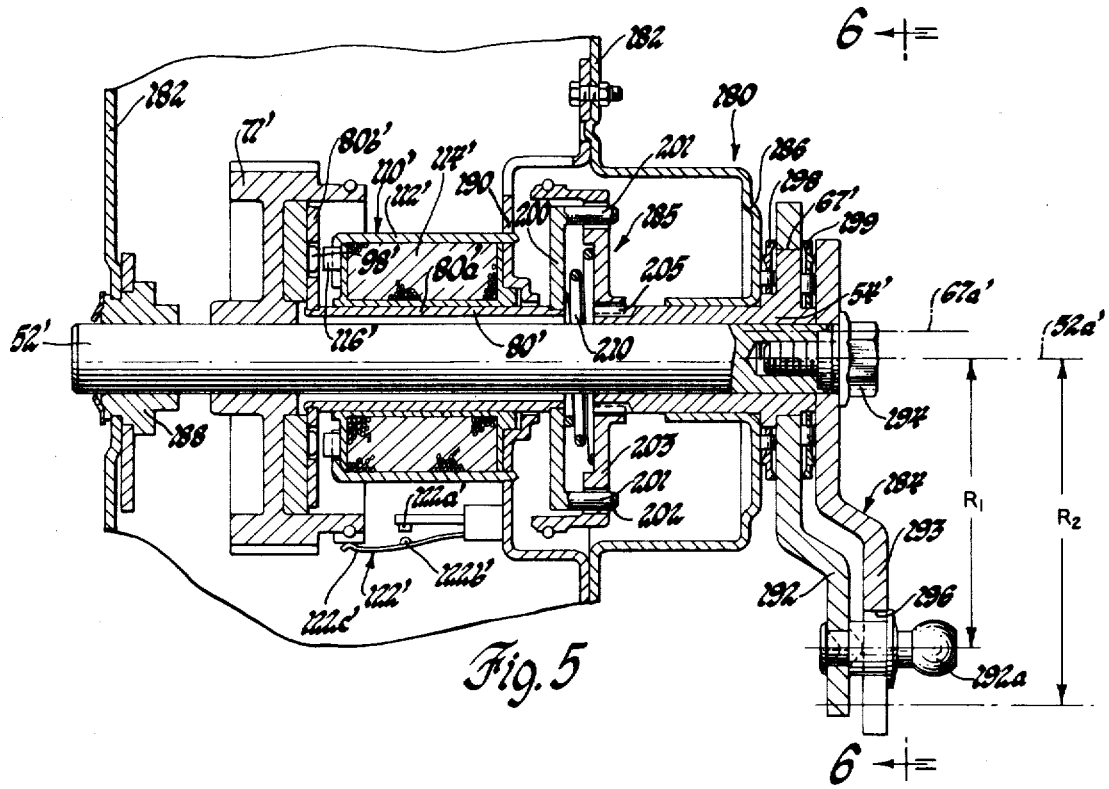
Fig. 5
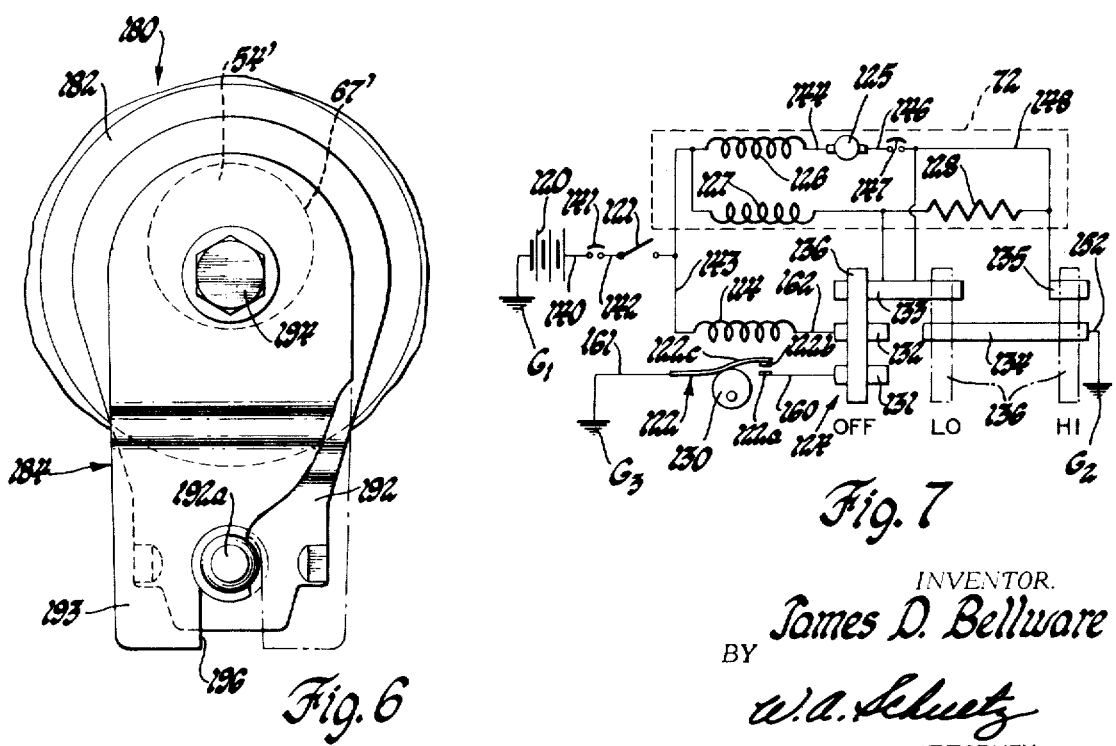
Fig. 6
Fig. 7
INVENTOR.
James D. Bellware
BY
W.A. Schuetz
ATTORNEY

DEPRESSED PARK WINDSHIELD WIPER

The present invention broadly relates to a windshield wiping system, and in particular to an actuating mechanism for use in oscillating a pair of windshield wipers between inboard and outboard positions during running operation and for moving the wiper to a park position spaced from the inboard position when wiper operation is being terminated.

The present invention is directed to a novel variable throw crank mechanism for use in a depressed park type windshield wiper system, and aims as one of its objects to provide a new and improved actuating or variable throw crank mechanism which is of a relatively simple and economical construction and which is operable to oscillate a pair of windshield wipers between inboard and outboard positions during running operation and for moving the wipers to a park position spaced from the inboard position when wiper operation is being terminated.

Another object of the present invention is to provide a new and improved variable throw crank mechanism for use in oscillating a pair of windshield wipers between inboard and outboard positions during running operation and for moving the wipers to a depressed park position spaced from the inboard position when wiper operation is being terminated, and in which the variable throw crank mechanism comprises a housing means, a drive shaft rotatably supported by the housing means, a drive member drivingly connected to the drive shaft, an eccentric supported for rotation relative to the drive shaft, a crank arm rotatably journaled on the eccentric, a means for drivingly connecting the crank arm to the drive shaft and for permitting the crank arm to move radially with respect to the drive shaft while being drivingly connected therewith, and a shiftable sleeve drivingly connected with the eccentric and which is shiftable between a first position in which it is drivingly engaged with the drive member to cause the eccentric to be rotated in unison with the drive shaft and the crank arm to be rotated through an orbit of a given radius to move the wipers between their inboard and outboard positions during running operation, and a second position in which the sleeve is disengaged from the drive member to cause the crank arm to be rotated relative to the eccentric and radially of the drive shaft to increase the throw of the crank arm and effect movement of the wipers to their park position when wiper operation is being terminated.

A further object of the present invention is to provide a new and improved variable throw crank mechanism, as defined in the next preceding object, and in which the shiftable sleeve is biased toward one of its positions by a spring means and is shiftable in opposition to the spring means towards its other position by a solenoid.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 5 is a vertical sectional view of an alternate embodiment of the windshield wiper system of the present invention;

FIG. 6 is an end elevational view looking in the direction of the arrow 6—6 of FIG. 5; and FIG. 7 is a schematic wiring diagram for controlling operation of the windshield wiper system shown in FIGS. 1 and 5.

Figure 1:
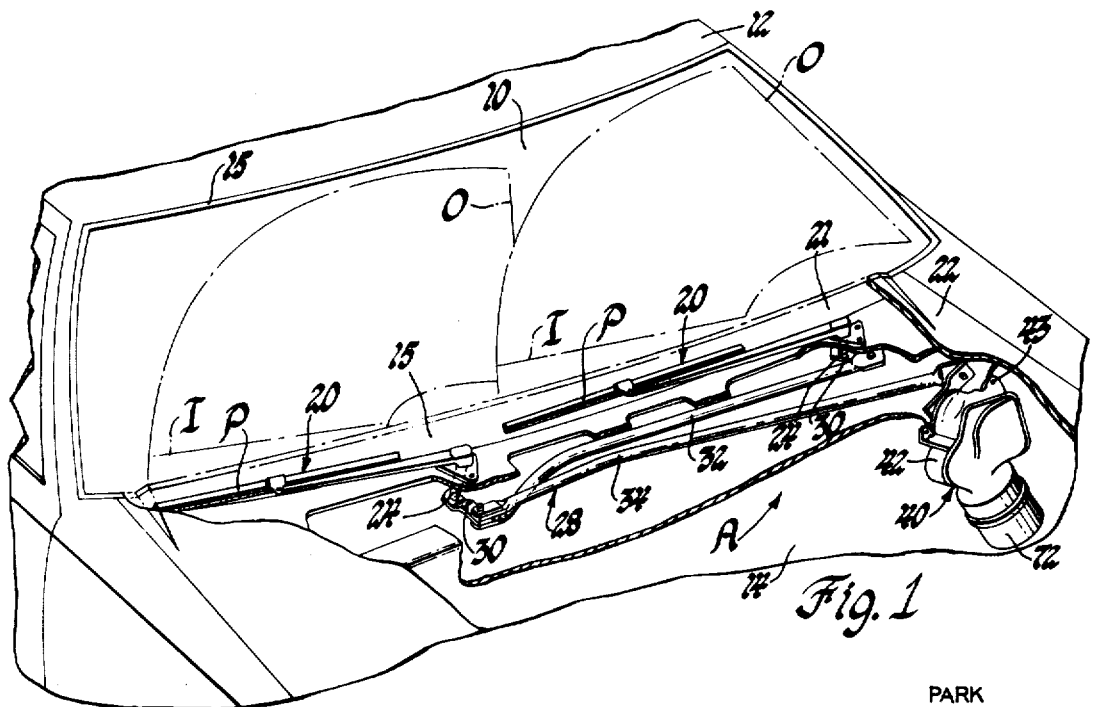
FIG. 1 is a fragmentary front elevational view of a vehicle embodying the novel windshield wiper system of the present invention.
Figure 2:
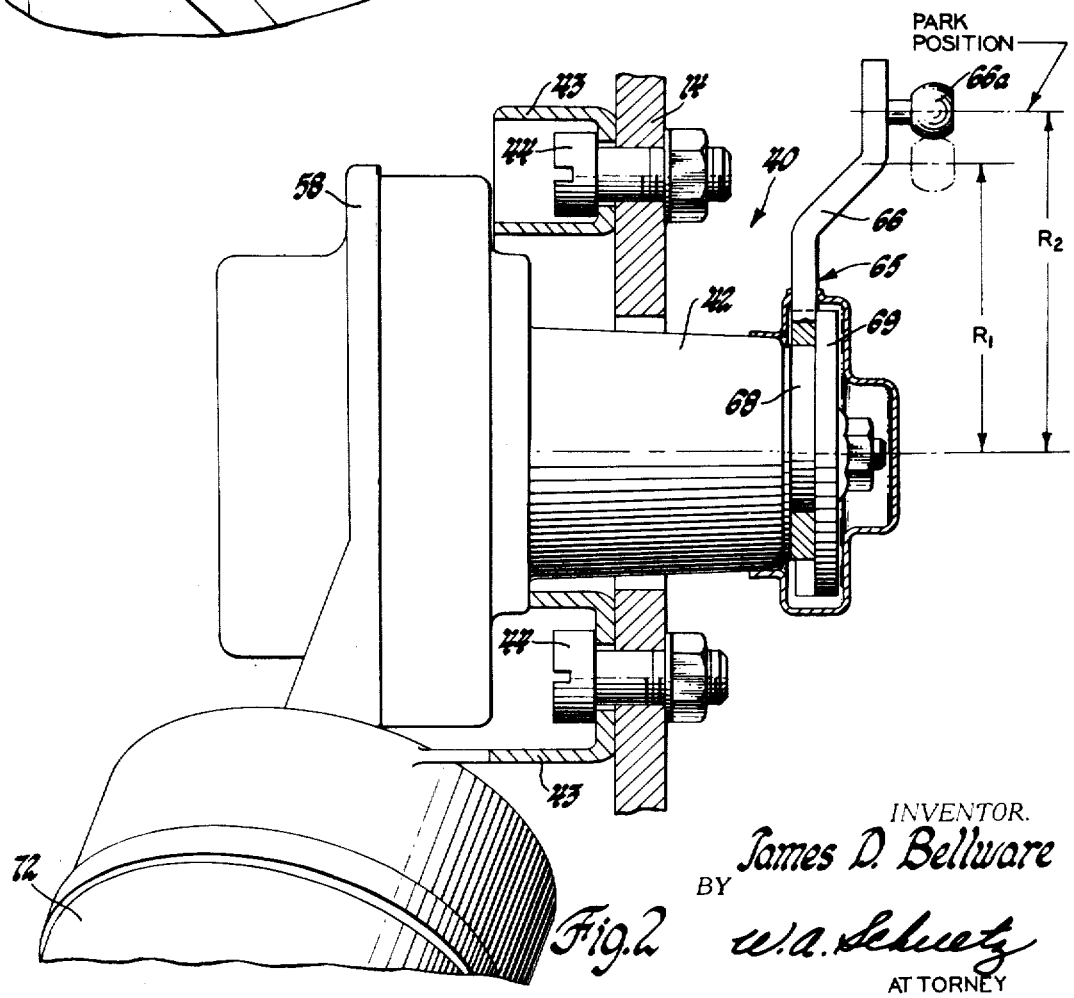
FIG. 2 is an enlarged sectional view, with portions shown in elevation, of part of the windshield wiper system.

The present invention provides a novel windshield wiping system A for wiping a windshield 10 of an automotive vehicle 12. The windshield wiper system A is suitably supported by the vehicle body structure 14 and the windshield 10 is surrounded by a reveal molding 15.

The windshield wiping system A includes a pair of spaced windshield wipers 20 which are adapted to be oscillated across the outer surface of the windshield 10 between inboard and outboard positions, designated by the letters I and O, during running operation and moved to a depressed park position P when wiper operation is being terminated. The wipers 20 when in their park position are disposed within a slot 21 extending transversely of the vehicle 12 and located between the windshield and the rearward edge of the vehicle hood 22. When the wipers 20 are in their park position they are parked on the reveal molding 15 and are concealed from view.

The wipers 20 are adapted to be drivingly connected to drive pivots 24 rotatably supported by the vehicle body structure 14. The drive pivots 24 are adapted to be oscillated to oscillate the wipers 20 by a drive transmission or linkage 28. The drive transmission 28, as shown in FIG. 1, comprises a pair of crank arms 30 having one end drivingly connected to one of the drive pivots 24, a cross link 32 swivelly connected at its opposite ends to the left and right crank arms 30 and a drive link 34 having one end swivelly connected to the leftmost crank arm 30.

In accordance with the provisions of the present invention, a novel actuating or variable throw crank mechanism 40 swivelly connected with the other end of the drive link 34 is provided for oscillating the wipers between their inboard and outboard positions I and O, respectively, and for moving the wipers to their depressed park position P. The novel mechanism 40 comprises a housing means 42 having a plurality of legs 43 which are bolted to the body structure 14 via suitable bolts 44. The housing means 42 further comprises a main body 46 having a central through opening 47 therethrough. The main body includes a forward portion 46a and a stepped rearward portion 46b. The opening 47 has first, second, third and fourth diameter portions 47a – 47d which progressively increase from the forward portion 46a of the housing to the rearward portion 46b thereof. The forward portion 46a of the housing includes a radially inwardly extending annular end wall 50 which defines the opening portion 47a.

The housing 46 is adapted to rotatably support a drive shaft 52. The drive shaft 52 at its forward end is rotatably journaled in an annular bushing or eccentric 54, the bushing 54 in turn being rotatably journaled in sleeve bearing 55 carried by the annular end wall 50. The shaft 52 at its rearward end is rotatably supported in an annular bearing or bushing 56 carried by a cover 58 which is suitably secured to the main housing portion 46. An annular flexible seal 60 is carried by the forward housing portion 46a and is in sealing engagement with the bushing 54 to prevent entry of foreign material into the interior 47 of the housing 46.

The drive shaft 52 is adapted to be drivingly connected to the drive link 34 of the drive transmission by a crank means 65. The crank means 65 comprises a crank arm 66 which is rotatably supported or journaled on an annular peripheral surface 67 of a flange 68 integral with the bushing 54. The axis 67a of the annular peripheral surface 67 is eccentric with respect to the axis 52a of the drive shaft 52. That is, the annular peripheral surface 67 has a center axis 67a which is parallel to, but radially spaced from the axis 52a of the shaft 52. The crank means 65 also includes a yoke member 69 which is drivingly connected to the drive shaft 52. To this end, the yoke member 69 has a noncircular opening 69a therethrough for receiving a noncircular portion 52b of the drive shaft 52. The yoke member 69 is clamped against a shoulder 52c on the shaft 52 by a nut 70. The yoke member 69 includes rearwardly extending portions 69b which straddle the crank arm 66 so that when the drive shaft 52 is rotated the yoke member 69 and crank arm 66 are also rotated. The rearward extending portions 69b of the yoke member 69 drivingly connect the crank arm 66 to the yoke member 69, but allows the crank arm 66 to be moved radially relative thereto and the drive shaft 52. The crank arm 66 is swivelly connected to a socket in the drive link 34 via a ball stud 66a.

The drive shaft 52 is adapted to be rotated by a drive member in the form of a worm gear 71 disposed in the opening portion 47d and which is suitably fixed to the drive shaft 52. The worm gear 71 is adapted to be in meshed engagement with a worm carried by an armature (not shown) of an electric motor 72. The motor 72 is suitably secured to the housing means 40.

The drive mechanism 40 further includes a shiftable sleeve 80 for selectively coupling and uncoupling the annular bushing or eccentric 54 with the worm gear 71. The sleeve 80 has an axially extending portion 80a and a radially extending portion 80b at its rearward end adjacent the worm gear 71. The axially extending portion 80a is slidably supported on the drive shaft 52 and on a hub portion 71a of the worm gear 71. The axial extending portion 80a of the sleeve 80 has a plurality of alternately spaced fingers 82 and recesses 83 at its forward end. The fingers 82 extend axially of the sleeve 80 and are located at circumferentially spaced locations. The bushing 54 at its rearward end likewise has a plurality of alternately spaced fingers 85 and recesses 86. The fingers 85 extend axially of the bushing and are at circumferentially spaced locations. The fingers 82 and 85 on the sleeve 80 and the bushing 54 are inter digitated. That is, the fingers 82 on the sleeve 80 are received within the recesses 86 in the bushing 54 and the fingers 85 of the bushing 54 are received within the recesses 83 of the sleeve 80. The fingers 82 and 85 drivingly connect the sleeve 80 with the bushing 54, but allow relative axial movement therebetween without disconnecting the drive connection. The radially extending flange portion 80b of the sleeve 80 has a slot 90 and an opening 91 at diametral opposite locations.

Figure 3:
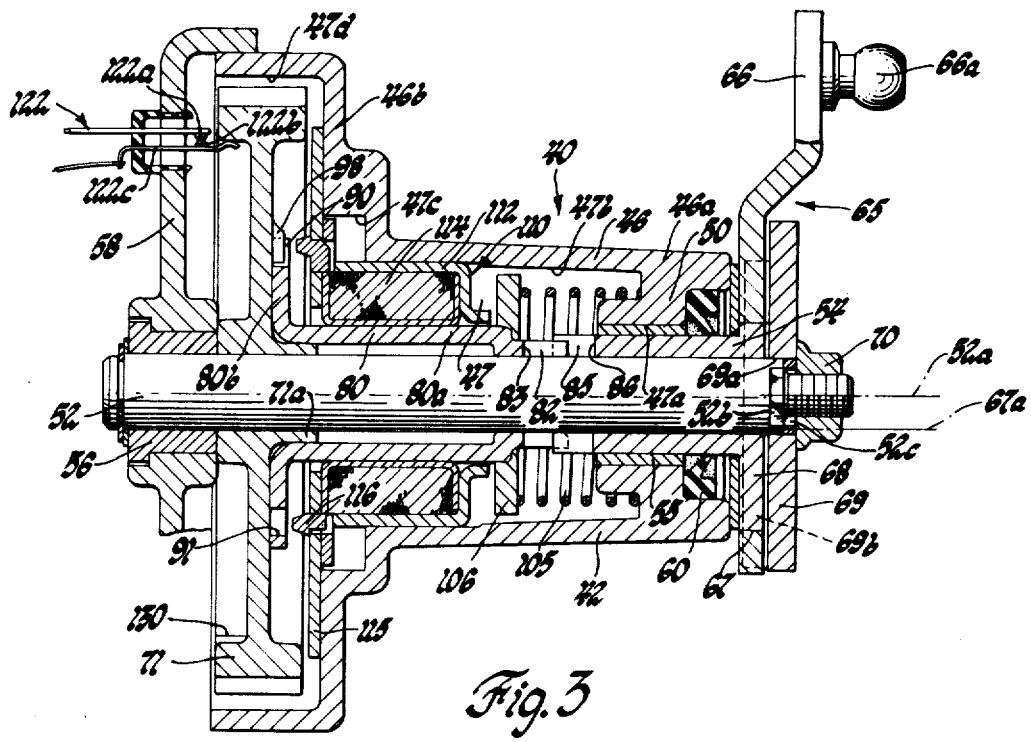
FIG. 3 is a vertical cross-sectional view of part of the windshield wiper system shown in FIG. 2.

The sleeve 80 is adapted to be shifted between first and second positions. The sleeve 80, when in its first position, as shown in FIG. 3, has its radially extending flange portion 80b in engagement with the forward side of the worm gear 71 and with the slot 90 receiving an axially extending projection or protrusion 98 on the worm gear 71. When in this position, the sleeve 80 is drivingly connected to the worm gear 71 so that the sleeve 80, bushing 54, drive shaft 52 and crank means 65 are all rotated in unison. When rotated in unison the crank arm 66 rotates in an orbit having a radius $R_1$ and the wipers 20 are oscillated between their inboard and outboard positions I and O, respectively.

Figure 4:
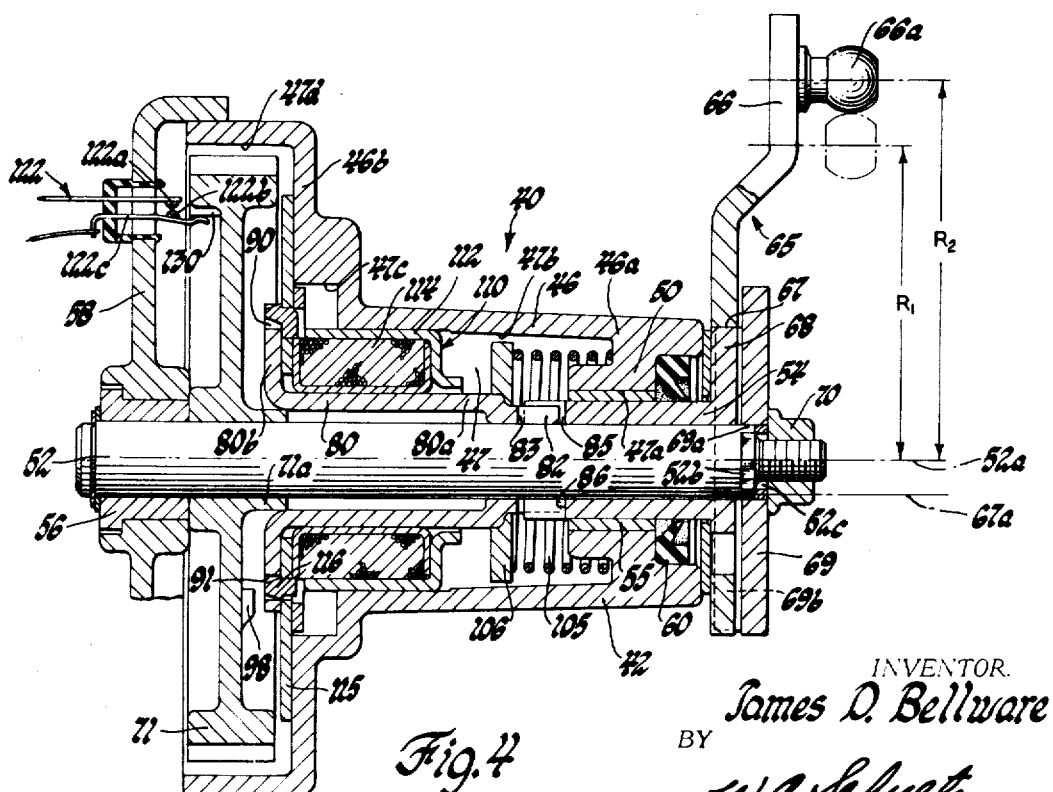
FIG. 4 is a view like that shown in FIG. 3 but showing different parts thereof in different positions.

When the sleeve 80 is shifted towards its second position, as shown in FIG. 4, the radially extending flange portion 80b is disengaged from the projection 98 on the worm gear 71. When in this position, the sleeve 80 and the bushing 54 are held stationary while the crank arm means 65 continues to rotate. During this rotation, however, the crank arm 66 is rotated relative to the eccentric surface 67 with the result that the crank arm 66 is also moved radially outwardly with respect to the axis 52a of the drive shaft 52 to an effective radius $R_2$. This movement effects movement of the wipers 20 toward their park position P, and in a manner to be hereinafter more fully described.

The shiftable sleeve 80 is biased towards its first position, as shown in FIG. 3, by a spring means 105. The spring means 105 includes a compression spring having one end in abutting engagement with the forward end wall 50 of the housing 46 and its other end in abutting engagement with an annular member or disc 106 carried by the shiftable sleeve 80.

The shiftable sleeve 80 is adapted to be moved from its first position, as shown in FIG. 3, toward its second position, as shown in FIG. 4, in response to energization of a solenoid 110. The solenoid 110 includes a suitable frame 112 carried within the opening portion 47b of the housing 46 and an annular coil 114. The solenoid 110 is secured to an annular disc 115, the disc in turn being secured to the stepped portion 46b of the housing via screws (not shown). The solenoid frame 112 adjacent its rearward end carries a pair of rearwardly extending projections 116 which are adapted to be received within the slot 90 and the opening 91 in the sleeve 80 when the latter is moved toward its second position to prevent the sleeve 80 from being rotated. The sleeve 80 serves as the armature or core for the solenoid 110.

Operation of the variable throw crank mechanism 33 for the windshield wiper system A is controlled by an electrical control circuit means shown schematically in FIG. 7. The electrical control means includes a battery 120 having one terminal connected to a ground $G_1$, the electric motor 72, a normally open ignition switch 121, the solenoid coil 114, a park switch 122 and a manual control switch 124. The electric motor includes an armature 125 and series and shunt field windings 126 and 127 and a resistor 128. The park switch 122 includes a stationary contact 122a and a movable contact 122b which is carried by a leaf spring 122c. The leaf spring 122c is inherently self-biased toward a closed position in which the contacts 122b and 122a engage each other, but is normally held in an open position by a cam 130 integral with the worm gear 71, as shown in FIG. 4.

The manual control switch 124 could be of any suitable or conventional construction and is schematically shown in FIG. 7 as including a plurality of spaced stationary contacts 131–135 and a movable or bridging contact member 136. The bridging member 136 is movable between an off position and a low and high speed position for continuously operating the wiper motor 72 at either low or high speed, and in the manner to be described hereinafter.

A complete cycle of operation of the wiper system A will now be described with reference to the schematic control diagram shown in FIG. 7. As noted hereinbefore, when the wipers 20 are in their park position P, the crank arm 66 is in the position indicated by radius $R_2$ in FIG. 4. When the operator desires low speed wiper operation, he will move the bridging member 136 from its off position to its low speed position, as shown in FIG. 7. This completes a circuit for energizing the wiper motor 72. The circuits are from battery 120, wire 140, circuit breaker 141, wire 142, now closed ignition switch 121 (since the vehicle would be running), wire 143, series field windings 126, wire 144, armature 125, wire 146, circuit breaker 147, wire 148, stationary contact 133, bridging contact 136, stationary contact 134, wire 152, to ground $G_2$. A circuit is also completed from wire 143, shunt field windings 127, wire 150, stationary contact 133, bridging member 136, stationary contact 134, wire 152, to ground $G_2$. Energization of the series and shunt field windings 126 and 127 and armature 125 of the motor 72 causes the motor 72 to operate at low speed and begin to rotate the worm gear 71.

It should be noted at this point that the solenoid 110 is not energized, since the park switch 122 is maintained open by the cam 130 and since the bridging member 136 has been moved to its low speed position thus breaking the bridging contact between the stationary contacts 132 and 131. With the solenoid 110 de-energized, the spring 105 biases the sleeve 80 towards its first position and against the projection 98 on the worm gear 71. However, since the wipers 20 are in their park position, the sleeve 80 will not drivingly engage the worm wheel 71, since the slot 90 will not be aligned with the projection 98 and hence, the flange portion 80b of the sleeve 80 will merely abut the projection 98. Also the thickness of the flange 80b is greater than the distance as measured axially of the housing 46 between the forward and rearward ends of the projections 98 and 116 and thus, the flange 80b remains engaged with the projections 116. This prevents the sleeve 80 from rotating.

Upon initial rotation of the worm gear 71 for 180°, the drive shaft 52 rotates the crank arm 66 relative to the eccentric surface 67 of the bushing 54 until the slot 90 aligns itself with the projection 98 whereupon the sleeve 80 is moved to its first position by the spring 105 to drivingly engage the worm gear 71. When this occurs the drive shaft 52, crank arm 66, bushing 54 and sleeve 80 are rotated in unison. During this relative movement, the effective radius or throw of the crank arm 66 is reduced from radius $R_2$ towards radius $R_1$ and the wipers 20 are moved from their park position P to their outboard position O. Once the sleeve 80 is drivingly connected to the worm gear 71, the wipers 20 are caused to be oscillated back and forth between their inboard and outboard positions I and O. It should also be noted that when the worm gear 71 rotates from its position shown in FIG. 4, the park switch 122 is allowed to close, but this does not effect energization of the solenoid 110, since the bridging member 136 is not bridging the stationary contacts 132 and 131.

When wiper operation is no longer desired, the operator will move the bridging member 136 from its low speed position to its off position. This breaks the hereinbefore described circuits for energizing the wiper motor 72. The wiper motor, however, remains energized due to the provision of the park switch 122, which is self-biased toward the closed position. These circuits are from battery 120, wire 140, circuit breaker 141, wire 142, now closed ignition switch 121, wire 143, series field windings 126, wire 144, armature 125, wire 146, circuit breaker 147, wire 148, stationary contact 133, bridging member 136, stationary contact 131, wire 160, contacts 122a and 122b, leaf spring 122c, wire 161 to ground $G_3$. Likewise, the circuit for the series field winding is from wire 143, shunt field winding 127, wire 150, stationary contact 133, bridging member 136, stationary contact 131, wire 160, now closed contacts 122a and 122b, leaf spring 122c, wire 161 to ground $G_3$. When the bridging member 136 is moved to its off position, a circuit is also completed for energizing the solenoid coil 114. This circuit is from battery 120, wire 140, circuit breaker 140, wire 142, now closed ignition switch 121, wire 143, solenoid coil 114, wire 162, stationary contact 132, bridging member 136, stationary contact 131, wire 160, now closed contacts 122a and 122b, leaf spring 122c, wire 161 to ground $G_3$.

Energization of the solenoid coil 114 draws the armature or sleeve 80 from its first position, as shown in FIG. 3, toward its second position, as shown in FIG. 4. If the wipers are not in their outboard position O when the solenoid 110 is energized, the flange 80b of the sleeve 80 will abut the projections 116 and remain drivingly connected to the worm gear 71 until the slot 90 and opening 91 are aligned with the projections 116. When this occurs the solenoid 110 moves the sleeve 80 to its second position, as shown in FIG. 4, in which it is disengaged from the worm gear 71 and prevented from rotating. This occurs when the wipers are in their outboard position O. When the driving connection between the worm gear 71 and the bushing 54 is broken, further rotation of the worm gear 71 causes the crank arm 66 to rotate relative to the eccentric surface 67 on the bushing 54, which in turn causes the throw or effective radius of the crank arm to be increased from $R_1$ toward $R_2$. This increase in the effective radius of the crank arm causes a greater reciprocation of the drive link 34 in the direction of the arrow 170, which in turn causes the wipers 20 to be moved beyond their normal inboard position I toward their park position P. When the crank arm 66 has been rotated 180° relative to the eccentric 54 the wipers 20 are in their park position P and the cam 130 will engage the leaf spring 122c of the park switch 122 to move the same to separate the contacts 122a and 122b. When the contacts 122a and 122b are separated, the circuits for the wiper motor and the solenoid coil 110 through the park switch 122 are broken and hence, the wiper system A is de-energized.

When the operator desires high speed operation of the wiper motor, he will move the bridging member 136 from its off position towards its high speed position. This completes a circuit for the series field winding 126 and the armature 125 of the wiper motor 72 to ground $G_2$ via the stationary contacts 135 to 134 rather than the stationary contacts 133 and 134 as in low speed operation. Also, in high speed position, the shunt field windings 127 are connected in series with the resistor 128, the resistor being connected to the stationary contact 135 via the wire 148. When the shunt field windings 127 are connected in series with the resistor 128, the speed of the wiper motor is increased, and in a manner well known to those skilled in the art. The operation with respect to the shiftable sleeve etc. is the same with respect to high speed operation as has been previously described with low speed operation.

FIGS. 5 and 6 show a slightly modified embodiment of an actuating mechanism 180 which could be used in place of the actuating mechanism 33 previously described. The actuating mechanism 180 is substantially similar to the actuating mechanism 33 previously described and corresponding parts thereof will be given the same reference numerals, but with a prime affixed thereto. The actuating mechanism 180 differs from the actuating mechanism 40 in that it employs a sheet metal housing 182, a different crank means 184 and a different means 185 for drivingly connecting the sleeve 80' to the eccentric bushing 54'. The sheet metal housing 182 has a cup-shaped end portion 186 which rotatably supports the eccentric bushing 54'. The housing at its other end portion supports a bushing 188, the bushings 54' and 188 in turn rotatably supporting the crank shaft 52'. Bolted to the end portion 186 of the sheet metal housing 182 is a frame or bracket 190 which supports the solenoid 110'.

The crank means 184 comprises a pair of crank arms 192 and 193, one of which is rotatably journaled on the annular eccentric surface 67' of the bushing 54' and the other of which is suitably secured and bolted to the crank shaft 52' by a bolt 194. The leftmost crank arm, as viewed in FIG. 5, carries a ball stud 192a which extends through an elongated vertically extending slot 196 in the crank arm 193. The provision of the slot 196 in the crank arm 193 enables the crank arm 192 to be eccentrically moved radially with respect to the axis of the shaft 52'. The ball stud 192a not only is swivelly connected to the drive link 34, but also serves to rotate the crank arm 192 in unison with the crank arm 193. The crank arm 192 is spaced from the end wall of the housing by a suitable washer or bearing 198 and the crank arms 192 and 193 are separated from each other by a suitable washer or bearing 199.

The shiftable sleeve 80' has secured to its rightmost end, as viewed in FIG. 5, an annular flange 200 having a plurality of circumferentially spaced, rearwardly extending pins 201. The pins are slidably received in openings 202 in an annular member 203 suitably splined to one end of the bushing 54', as indicated at 205. The shiftable sleeve 80' is biased towards its first position, as shown in FIG. 5, by a compression spring 210 having one end in abutting engagement with the member 203 and its other end in abutting engagement with the member 200. In this position, the flange 80b' of the sleeve 80' drivingly engages the projections 98' on the worm gear 71 to cause the eccentric bushing 54' to be rotated in unison with the drive shaft and the crank arm 192 to be rotated in an orbit having the radius $r_1$. The shiftable sleeve 80' is adapted to be moved toward the right in opposition to the biasing force of the spring 210 to disengage the driving connection with the worm gear 71' and the sleeve 80' by the solenoid 110' when wiper operation is being terminated. The sleeve 80' is shiftable with respect to the drive bushing 54' as a result of the slidable pin and slot connection between the members 200 and 203. When the sleeve 80' is shifted toward the right the crank arm 192 is rotated relative to the eccentric bushing 54' to cause the effective radius of the crank arm 192 to be increased to $R_2$ and the wipers moved toward their park position.

The actuating mechanism shown in FIGS. 5 and 6 operates and is controlled in the same manner as that previously described in connection with the actuating mechanism 33.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. An actuating mechanism for use in oscillating a windshield wiper between inboard and outboard positions during running operation and for moving the wiper to a park position spaced from the inboard position when wiper operation is being terminated comprising: a housing means; a drive shaft rotatably supported by the housing means; a drive member drivingly connected to said drive shaft; an eccentric supported for rotation relative to said drive shaft; a crank arm rotatably journaled on said eccentric; means for drivingly connecting said crank arm to said drive shaft and for permitting said crank arm to move radially with respect to said drive shaft; a shiftable sleeve supported for movement axially of said drive shaft and drivingly connected with said eccentric; said sleeve being shiftable between a first position in which it is drivingly engaged with said drive member to cause said eccentric to be rotated in unison with said drive shaft and said crank arm to be rotated in an orbit of a given radius during running operation of the wipers and a second position in which it is disengaged from said drive member to cause said crank arm to be rotated relative to said eccentric and be shifted radially with respect to the drive shaft to increase the radius of a crank arm orbit and effect movement of the wipers to their park position, and means for effecting movement of said shiftable sleeve towards its first position when wiper operation is being initiated and for effecting movement of the sleeve towards its second position when wiper operation is being terminated, respectively.

2. A variable throw crank mechanism for use in oscillating a windshield wiper between inboard and outboard positions during running operation and for moving the wipers to a park position spaced from the inboard position when wiper operation is being terminated comprising: a housing means; a drive shaft rotatably supported by the housing means; a drive gear drivingly connected to said drive shaft adjacent one end thereof; a bushing rotatably supported by the housing and surrounding the drive shaft adjacent its other end; said bushing including an annular peripheral surface which is eccentric with respect to the drive shaft; a crank arm rotatably journaled on said eccentric surface of the bushing; means for drivingly connecting said crank arm to said drive shaft and for permitting said crank arm to move radially with respect to the drive shaft; a shiftable sleeve slidably supported by the drive shaft for movement relative thereto, said shiftable sleeve and said bushing having cooperably engageable portions for drivingly connecting the shiftable sleeve to the bushing and for permitting the sleeve to be shifted while being maintained in driving relationship with the bushing; said sleeve having a radially extending flange provided with a radially extending slot and said drive gear having an axially extending projection; said sleeve being shiftable between a first position in which the slot in the flange receives the projection on the drive gear to drivingly connect the sleeve to the drive gear and cause said sleeve and bushing to be rotated in unison with said drive shaft and said crank arm to be rotated through an orbit of a given radius during running operation of the wipers and a second position in which the flange thereof is disengaged from the projection on the drive gear to cause the crank arm to be rotated relative to the eccentric surface of the bushing and be moved radially with respect to the drive shaft to increase the orbit radius of the crank arm and effect movement of the wipers to their park position, spring means for biasing said shiftable sleeve towards one of its positions; and solenoid means selectively energizable for effecting shifting movement of said sleeve from said one position towards its other position.

3. A variable throw crank mechanism for use in oscillating a windshield wiper between inboard and outboard positions during running operation and for moving the wipers to a park position spaced from the inboard position when wiper operation is being terminated comprising: a housing means; a drive shaft rotatably supported by the housing means; a drive gear drivingly connected to said drive shaft adjacent one end thereof; a bushing rotatably supported by the housing and surrounding the drive shaft adjacent its other end; said bushing including an annular peripheral surface which is eccentric with respect to the drive shaft; a crank arm rotatably journaled on said eccentric surface of the bushing; means for drivingly connecting said crank arm to said drive shaft and for permitting said crank arm to move radially with respect to the drive shaft; a shiftable sleeve slidably supported by the drive shaft for movement relative thereto, said shiftable sleeve and said bushing having cooperably engageable portions for drivingly connecting the shiftable sleeve to the bushing and for permitting the sleeve to be shifted while being maintained in driving relationship with the bushing; said sleeve having a radially extending flange provided with a radially extending slot and said drive gear having an axially extending projection; said sleeve being shiftable between a first position in which the slot in the flange receives the projection on the drive gear to drivingly connect the sleeve to the drive gear and cause said sleeve and bushing to be rotated in unison with said drive shaft and said crank arm to be rotated through an orbit of a given radius during running operation of the wipers and a second position in which the flange thereof is disengaged from the projection on the drive gear to cause the crank arm to be rotated relative to the eccentric surface of the bushing and be moved radially with respect to the drive shaft to increase the orbit radius of the crank arm and effect movement of the wipers to their park position, spring means for biasing said shiftable sleeve towards one of its positions; and solenoid means selectively energizable for effecting a shifting movement of said sleeve from said one position towards its other position, said solenoid means having a projection thereon which is aligned with said slot in said flange of said sleeve, said slot receiving said projection on said solenoid means to prevent rotation of said sleeve and said bushing when said sleeve is moved to its second position.

* * * * *